Patented Feb. 28, 1933

1,899,562

UNITED STATES PATENT OFFICE

JOHN STANLEY DUNN, OF NORTON-ON-TEES, ENGLAND, ASSIGNOR TO IMPERIAL CHEMICAL INDUSTRIES, LIMITED, OF LONDON, ENGLAND, A BRITISH COMPANY

PROCESS FOR THE REMOVAL OF ARSENIC FROM SULPHUR

No Drawing. Application filed February 10, 1932, Serial No. 592,186, and in Great Britain February 11, 1931.

This invention relates to the production of pure sulphur and in particular to the production of arsenic-free sulphur from sulphur-containing gases obtained in the roasting of sulphur-bearing ores, such as pyrites, which contain arsenic as an impurity. The sulphur-containing gases may have been obtained directly from ore, for instance, by roasting with a limited supply of air, or they may have been derived by the reduction of sulphur dioxide in any suitable manner. The invention is also applicable to the purification of sulphur vapour produced by the distillation of crude sulphur.

The invention consists in a process for the removal of arsenic from sulphur by treating the same in vapour or liquid form with a molten reagent comprising a sulphur compound such as the sulphide and/or polysulphide of an alkali metal. The molten reagent may consist initially of a sulphide or polysulphide of an alkali metal, such as sodium or potassium sulphide or polysulphide, or of substances, e. g. sodium and potassium hydroxides or carbonates, which will react with sulphur to yield alkali metal sulphides and/or polysulphides.

The invention is preferably carried out by treating the sulphur vapour, or gas containing the same, at a temperature of 250° C. or over, by bubbling it through the molten sulphide or polysulphide or by employing any other gas washing apparatus which is suitable for treating relatively large quantities of gas with small quantities of liquids. The gases may also be passed over inert packing material which is impregnated or irrigated with the sulphide or polysulphide. As the sulphur will react with the molten sulphide forming polysulpide and will also dissolve in the same to some extent, the molten reagent may consist of a mixture of sulphide, polysulphide and sulphur in varying proportions.

The following example illustrates on an experimental scale the efficiency of the molten reagents employed according to the invention.

Example 85 gms. of sulphur having an arsenic content of 5,000 parts per million were distilled at a temperature of 250° C. through a small column containing beads moistened with 5 gms. of molten potassium sulphide. The exit vapours were condensed and the arsenic content was found to have been reduced to 5 parts per million. As further quantities of sulphur containing the same amount of arsenic as impurity were distilled through the same quantity of potassium sulphide, the arsenic content of the purified product slowly increased to the order of 25 parts per million, but the potassium sulphide continued to be effective until about 186 gms. of sulphur in all had been treated.

I claim:

1. In a process for the removal of arsenic from impure sulphur, the step of contacting said sulphur at elevated temperature with a reagent comprising a molten sulphur compound of an alkali metal.

2. In a process for the removal of arsenic from impure sulphur, the step of contacting said sulphur in vapor form with a reagent comprising a molten sulphur compound of an alkali metal.

3. In a process for the removal of arsenic from impure sulphur, the step of contacting said sulphur in vapor form and at a temperature of at least 250° C. with a reagent comprising a molten sulphur compound of an alkali metal.

4. In a process for the removal of arsenic from impure sulphur, the step of passing sulphur vapors in contact with a molten reagent comprising initially potassium sulphide.

In testimony whereof, I affix my signature.

JOHN STANLEY DUNN.